(12) United States Patent
Wenger et al.

(10) Patent No.: US 6,340,487 B1
(45) Date of Patent: Jan. 22, 2002

(54) MULTIPLE PURPOSE QUICK-CHANGEOVER EXTRUSION SYSTEM

(75) Inventors: Lavon G. Wenger; Bobbie W. Hauck, both of Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 0 days.

(21) Appl. No.: 09/536,893

(22) Filed: Mar. 28, 2000

(51) Int. Cl.$^7$ ............................. A23P 1/00; B01F 7/00; B29C 47/00
(52) U.S. Cl. ......................... 426/231; 99/348; 99/353; 366/141; 425/135; 425/148; 426/516
(58) Field of Search ................................. 426/231, 516, 426/519; 366/18, 141, 142, 298, 334; 425/135, 148; 99/348, 353

(56) References Cited

U.S. PATENT DOCUMENTS

| | | | | |
|---|---|---|---|---|
| 4,752,139 A | * | 6/1988 | Hauck | 366/298 |
| 4,882,105 A | * | 11/1989 | Volk, Jr. | 426/516 |
| 5,238,385 A | | 8/1993 | Johnson | 426/516 |

OTHER PUBLICATIONS

Wenger brochure, "Wenger TX Magnum Extruder", Bulletin No. MAG–498.
Wenger brochure, "Optima Single Screw Extruder", Bulletin No. OPT–598.
Wenger brochure, "Wenger Cascade Dryer", Bulletin No. CD699.

* cited by examiner

*Primary Examiner*—George C. Yeung
(74) *Attorney, Agent, or Firm*—Hovey, Williams, Timmons & Collins

(57) ABSTRACT

Improved, high-capacity extrusion systems (20, 220) are provided which minimize product losses and permit the user to conduct multiple, segregated short extrusion runs with a minimum of down time between runs. The systems (20, 220) include an extruder assembly (21, 221) having a special, multiple-position die assembly (28), as well as an upstream preconditioner (24) and feed bin assembly (22). A variable speed, variable output discharge screw feeder (78) is located between the preconditioner outlet (62) and extruder barrel inlet (90). A PLC-type controller (30) coupled to the extruder assembly components establishes a choke full condition at the discharge feeder (78) so that continuous uninterrupted flow of preconditioned material to the extruder (26) at a uniform mass flow rate is maintained for as long as possible. In preferred forms, load cells (46, 72) are operatively coupled to the bin assembly (22) and preconditioner (24) so as to monitor material flow through the systems (20, 220). A multiple stage cascade-type dryer assembly (29) is provided downstream of extruder (26). The assembly (29) is controlled via the controller (30) in coordination with the extruder assemblies (21, 221) so as to maintain the segregation between separate product runs throughout the drying operation.

41 Claims, 10 Drawing Sheets

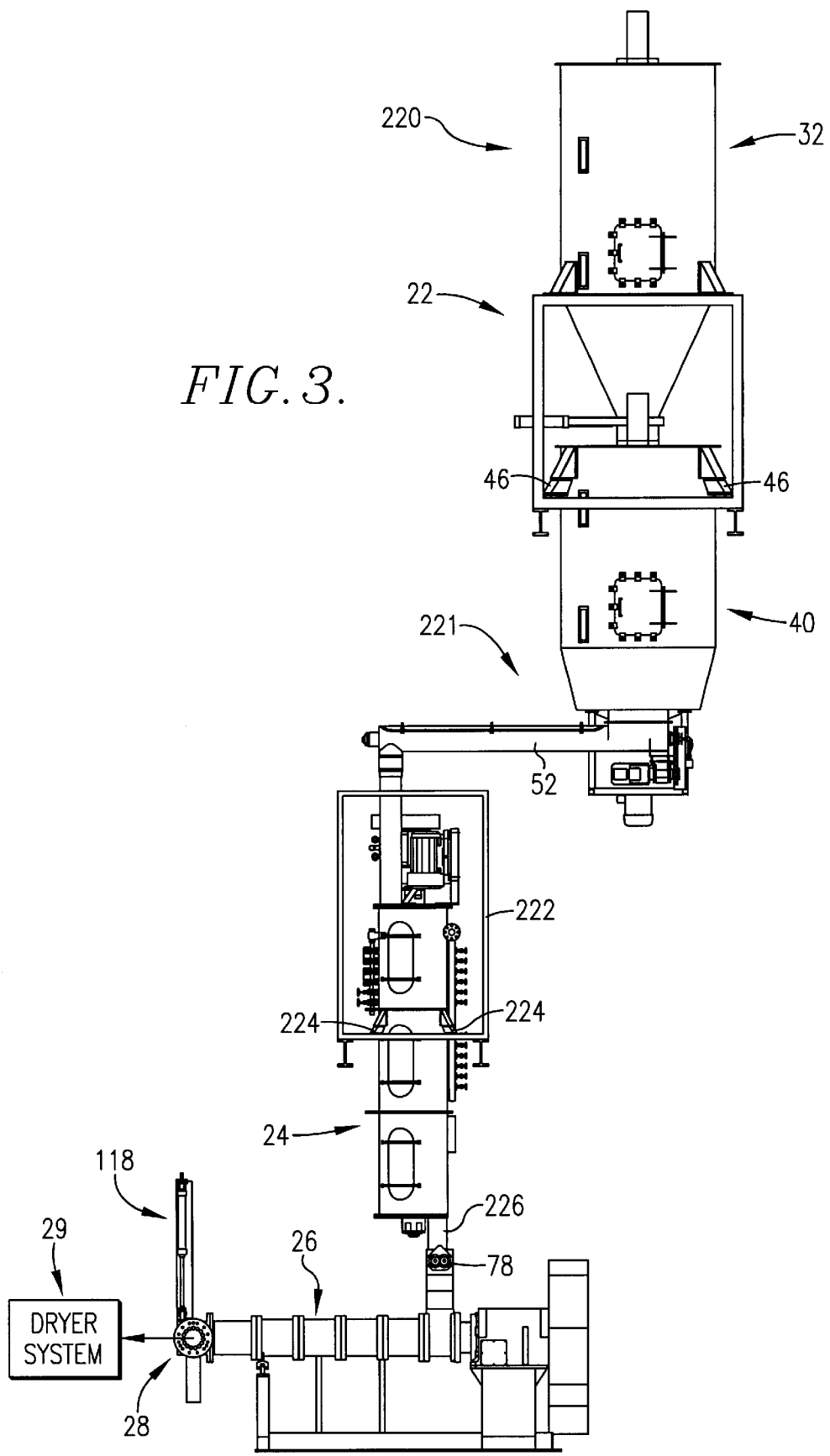

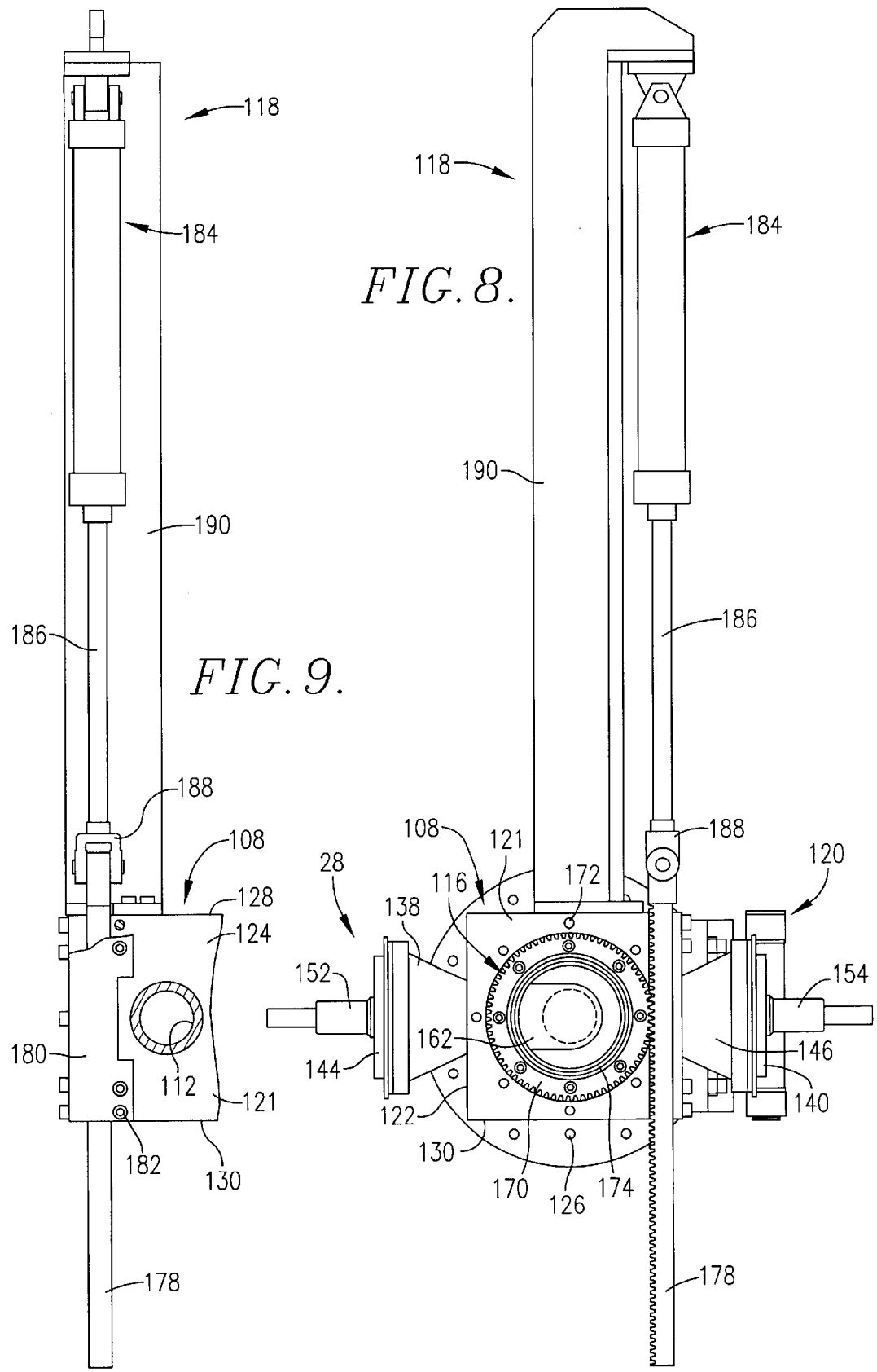

MULTIPLE PURPOSE QUICK-CHANGEOVER EXTRUSION SYSTEM

BACKGROUND OF THE INVENTION

1. Field of the Invention

The present invention is broadly concerned with extrusion systems and methods characterized by a minimum of down time between individual runs and with comparatively little waste of starting materials during the course of the runs. More particularly, the invention is concerned with such methods and systems wherein the extrusion systems include a preconditioner and an extruder coupled in series with a variable speed discharge device therebetween; in use, the systems are run so as to maintain the discharge device in a full choke condition for as long as possible so that the extruder receives material at a continuous and non-varying rate throughout substantially all of a given run. This allows proper processing of almost all of the starting material while permitting rapid clearing of the system so that a new run can be almost immediately commenced. In preferred forms, a staged vertical cascade-type dryer forms a part of the system and permits drying/cooling of the individual products from the extruder in a continuous and product segregated fashion.

2. Description of the Prior Art

Extrusion systems have long been used for the production of a variety of food and other products. For example, many pet and human foods are produced using such equipment. Many extrusion systems include a preconditioner and an extruder in series relationship. Dry materials are fed from a bin system into the preconditioner outlet, where the materials are moisturized and partially cooked through application of steam and/or water and intense mixing. Such preconditioning materials are then fed into the inlet of an extruder equipped with one or more elongated, axially rotatable augers and an endmost apertured extrusion die. In the extruder, the materials are subjected to intense heat, pressure and shear and are forced through the extrusion die for complete cooking and shaping. Thereafter, the extruded products are typically dried and cooled in a multiple-pass dryer.

While extrusion systems of this type are common, significant operational problems remain. One such issue is the amount of waste involved in any given production run. Specifically, at the start up of a run waste is generated while the system comes into equilibrium and essentially continuous flow rates, pressures, temperatures, and residence times are established. Even more significant, however, is the waste problem encountered at the end of an extrusion run. Thus, when the last of a quantity of starting material is fed to the preconditioner, there inevitably follows a period where the flow of material to the extruder falls off until the preconditioner is emptied. Normally, the product produced during this last run stage is unacceptable and must be discarded. When it is considered that preconditioners hold from 900–1800 pounds of material, it will be appreciated that the last-stage waste is significant.

The above problem may not be deemed overly serious where large production runs are involved. Thus, if a 40-ton run is scheduled, the loss of 1,000 pounds of starting material may be sustainable. However, there is an increasing tendency to schedule short production runs of 5,000 pounds or less. In such cases the loss of 1,000 pounds at the end of the production run is economically unacceptable. This problem is so acute that some processors report that they obtain only a 60% yield on 4-ton batch runs.

Another adverse factor in extrusion processing stems from the down time associated with run changeovers. That is, where a processor wishes to change over a given system between two different products, down times of an hour or more are not uncommon. Again, where large-volume runs are scheduled, an operator can live with long down times. However, if a series of short (e.g., 5-ton or less) runs are scheduled on a production day, it will be seen that the changeover problem becomes significant.

The short run phenomenon also has a potentially adverse consequence for the post-extrusion drying operation. That is, the end-stage extrudate from a first run must not be allowed to commingle with the first-stage product from the next succeeding run. Therefore, unless special steps are taken, the extruder must be shut down between runs to allow sufficient time for passage and clearance of all the extruded product through the dryer.

There is accordingly a need in the art for improved extrusion systems and processes which overcome the problems outlined above and provide a quick changeover capability while also minimizing product loss.

SUMMARY OF THE INVENTION

The present invention overcomes the problems outlined above and provides improved extrusion systems, components thereof, and methods. Broadly speaking, the extrusion systems of the invention include an extruder having an elongated barrel with at least one axially rotatable, flighted auger therein, with the barrel presenting an inlet and an outlet and a die mounted at the barrel outlet. Such systems also include a preconditioner having shiftable mixing elements therein and an inlet for receiving material and an outlet coupled with the extruder barrel for feeding preconditioning material to the latter. A bin assembly and a variable speed inlet feeder screw are also normally coupled with the preconditioning inlet for feeding starting materials to the preconditioner.

An important part of the extrusion systems of the invention involves the use of a variable speed, variable output discharge feeder such as a screw feeder between the preconditioner outlet and the extruder inlet. In order to maximize usage of starting material, the system is run so that the screw feeder is maintained in a choke full condition for as long as possible. In this way, a steady and substantially constant flow of preconditioned material is delivered to the extruder for final processing. In order to accomplish this end, the control for the system may be set so as to alter preconditioner operation toward the end of a given extrusion run. To give one example, where a horizontally oriented preconditioner is employed the system may be set up so that, towards the end of the run, the preconditioner operation is altered to maintain the choke full condition at the discharge feeder. Such alteration may involve reversing the rotation of the preconditioner mixing paddles to force more material forwardly to sustain the choke full condition.

In another related aspect of the invention, the extrusion systems include one or more detectors coupled with a microprocessor controller such as a programmable logic controller (PLC). A detector assembly is operatively associated with at least the preconditioner (and usually the bin assembly as well) in order to determine the flow rate of material passing therethrough. Preferably, the mass flow rate is determined, but a volumetric flow rate could also be measured. The controller can then adjust system operation to maintain constant flow to the extruder for as long as possible. Preferably, a first detector (preferably in the form of a weighing device such as a load cell) is coupled with the bin assembly for determining when substantially the last of a predetermined quantity of starting material has been fed to the preconditioner. A second detector (also preferably a load cell) is coupled with the preconditioner and the two detectors are used to determine the flow rate through the preconditioner.

In order to further minimize down time, the systems of the invention preferably include a specialized multiple-position die assembly which can be rapidly shifted between first and second separate dies without the need for laborious changeovers which stop production. The preferred die assembly of the invention includes a head assembly including first and second spaced outlets with individual die members coupled thereto. A shiftable member such as a cylindrical rotor is located within the head and includes an elongated product-conveying passageway presenting a product inlet opening adjacent the extruder barrel outlet, and a spaced product outlet. A drive is connected to the shiftable member and is operable to selectively move the passageway outlet between the first and second dies. In addition, a third discharge outlet is preferably provided between the die outlets. The drive can move the passageway outlet to the discharge position during the hiatus between product runs so that the extrusion system can be flushed and unwanted extrudate discarded.

The extruder systems of the invention also preferably includes a dryer (preferably a multiple-stage cascade dryer) which receives extrudate from the extruder for drying and cooling. The operation of the dryer is correlated with the extruder operation so that products can be continuously dried but in a segregated fashion, i.e., the product from a first extrusion run is dried and maintained separate from the extrudate from a second extrusion run. Advantageously, the dryer is operatively coupled to the PLC for the extruder and related equipment.

Use of the systems and methods of the invention affords numerous advantages. Primary among these is the ability to process a salable product using a very high proportion of the starting materials. For example, where short product runs of up to about 10,000 pounds are performed, at least 90% and more preferably at least about 95%, and most preferably at least about 97%, of the starting material is converted into salable product. This proportion far exceeds the short-run yield obtainable with conventional systems. Second, the systems and methods of the invention allow a very rapid changeover between individual products. This is especially the case when use is made of the preferred control apparatus and die assembly hereof. Third, the systems of the invention permit the user to vary the residence time of material in the preconditioner during the course of an extrusion run while maintaining a constant output to the extruder.

BRIEF DESCRIPTION OF THE DRAWINGS

FIG. 3 is a side elevational view of another quick-changeover extruder system employing a vertically mounted preconditioner;

FIG. 8 is a front view of the die assembly of the invention, shown with the front cover plate thereof removed so as to depict a rack and pinion drive for the die assembly;

FIG. 9 is a fragmentary side view of the forward end of one die assembly, illustrating further details of the rack and pinion drive;

DETAILED DESCRIPTION OF THE PREFERRED EMBODIMENT

Figure 2:
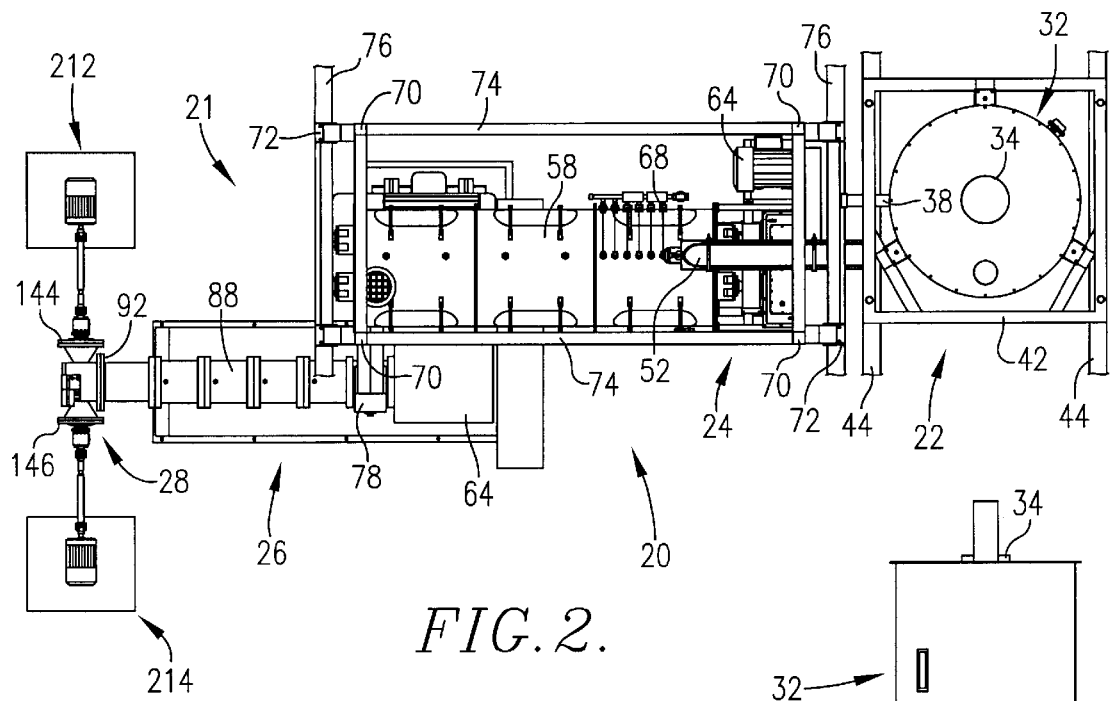
FIG. 2 is a plan view of the system depicted in FIG. 1.
Figure 1:
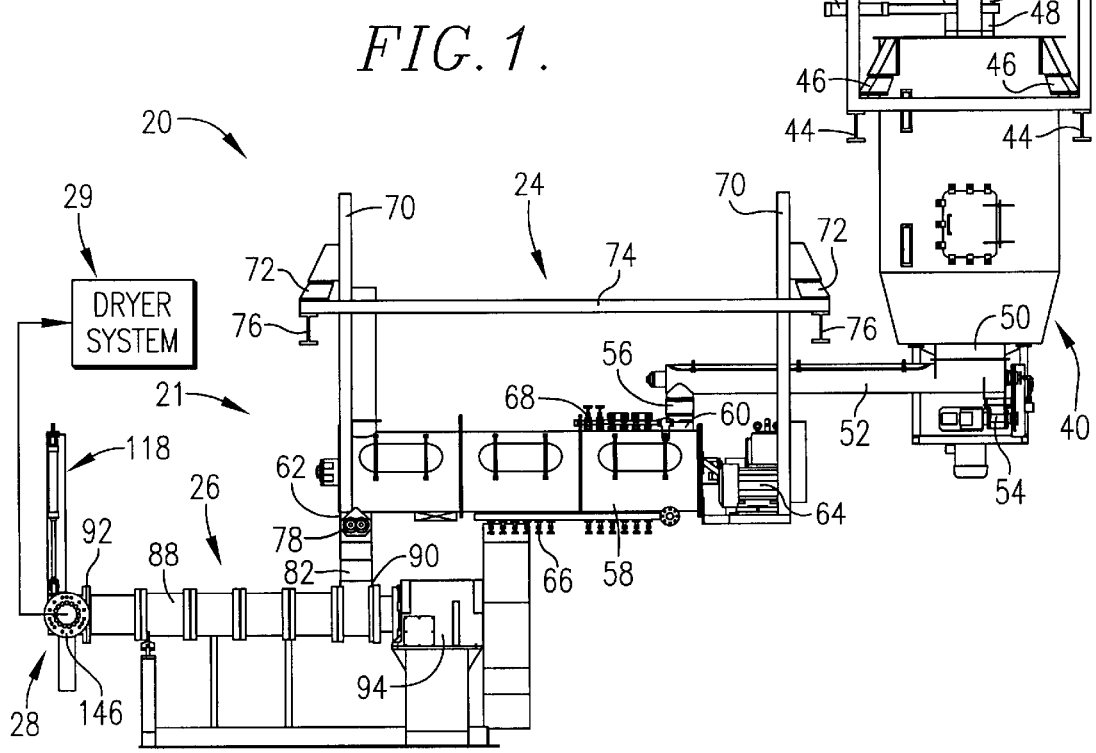
FIG. 1 is a side elevational view of a quick-changeover extruder system in accordance with the invention.

Turning now to the drawings and particularly FIGS. 1–2, a representative extruder system 20 in accordance with the invention is illustrated. Broadly speaking, the system 20 includes an extruder assembly 21 comprising a bin assembly 22 for receiving, handling, and feeding of dry materials, a preconditioner 24, extruder 26, and specialized die assembly 28. The output from extruder 26 is delivered to a dryer system 29. As will be explained in more detail, the system 20 is controlled by means of a programmable logic controller 30 (see FIGS. 10 and 13) which is operatively coupled with components of the system.

The Extruder Assembly

The bin assembly 22 includes an upper surge bin 32 equipped with an inlet 34 and an outlet 36. A selectively actuatable slide gate mechanism 38 is provided adjacent the outlet 36 for opening and closing the latter during operation of the system 20. A conventional product handling system (not shown) is typically coupled to the inlet 34 of surge bin 32, in order to deliver dry ingredients thereto.

The assembly 22 also includes a live bottom bin 40 positioned beneath the surge bin 32. In this connection, it will be observed that a box-type frame 42 is secured to surge bin 32 and supported by rails 44. The bin 40 is supported on the frame 42 by means of conventional load cells 46. The inlet 48 of the bin 40 is coupled to the outlet 36 of surge bin 32 so that when the gate mechanism 38 is opened, material may flow directly from the surge bin into the live bottom bin. The bin 40 includes an outlet 50 which is coupled to an elongated, variable speed auger-type feed screw 52. The feed screw is powered by means of drive assembly 54 and has an outlet 56.

Figure 10:
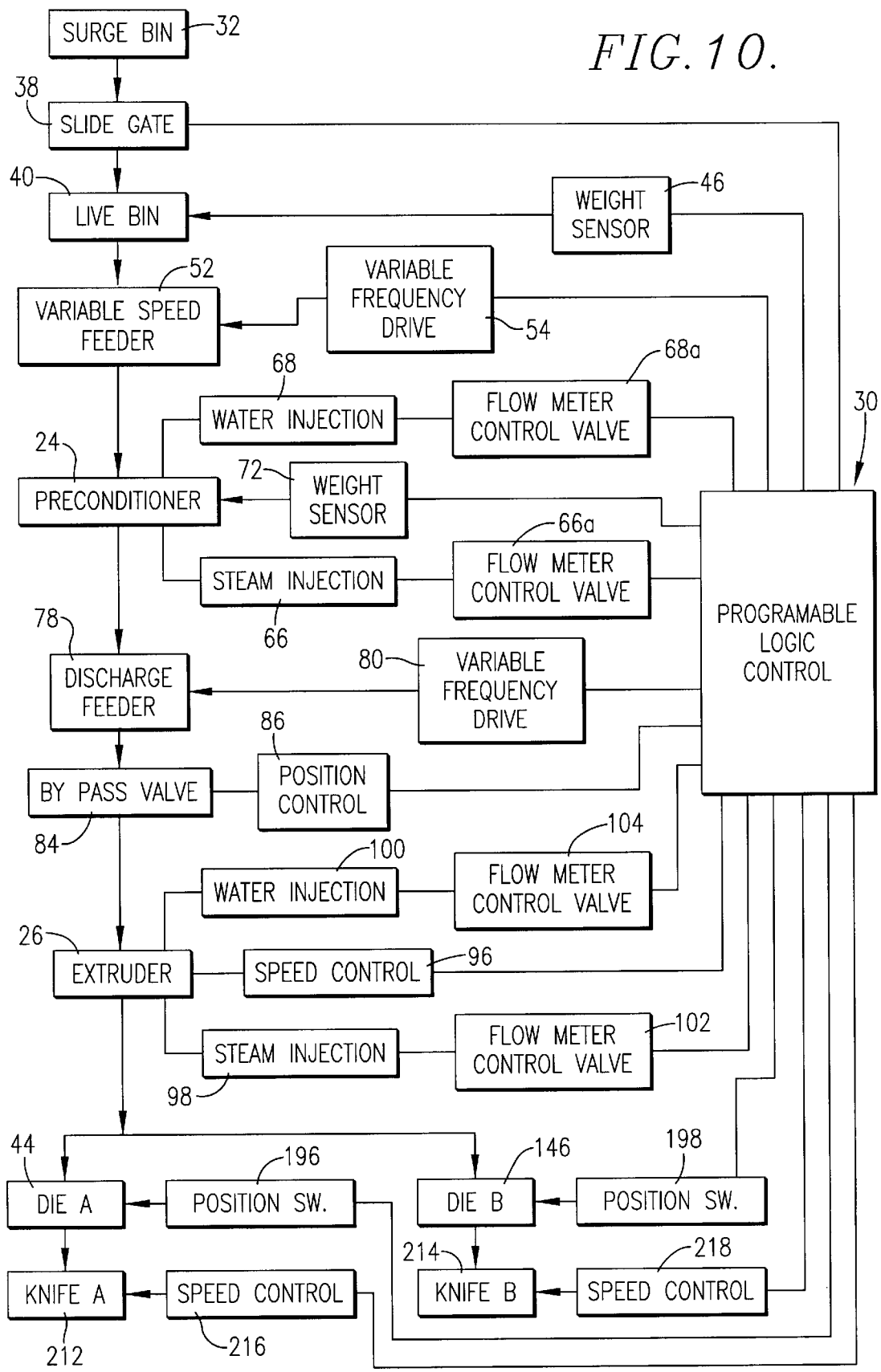
FIG. 10 is a schematic box diagram illustrating the control assembly for the extruder system of the invention.

The preconditioner 24 is preferably of the type described in U.S. Pat. Nos. 4,752,139 and 5,161,888, incorporated by reference herein. Generally speaking, the preconditioner 24 is in the form of an elongated tubular body 58 presenting an inlet 60 and an outlet 62. A pair of elongated drive shafts (not shown) are situated within body 58 and are rotated at different speeds through a drive unit 64. The shafts support outwardly extending paddle-type mixers, which are strategically oriented so as to control the flow of material through the preconditioner body and to achieve adequate residence time therein so that the material is properly moisturized and heated before entering the extruder 26. In addition, the preconditioner 24 is equipped with steam injectors 66 and water injectors 68. The injectors 66, 68 are connected to conventional flow meter control valves 66*a* and 68*a* (FIG. 10). As illustrated, the preconditioner 24 is supported on four upright corner frame members 70 each having a load cell 72 thereon. The four load cells 72 are in turn supported on rigid crossframe members 74 and underlying crossrails 76.

An important feature of the present invention is the provision of a variable speed, variable output screw-type discharge feeder 78 equipped with a variable frequency drive 80 (FIG. 10) between the outlet 62 of preconditioner 24 and the inlet of extruder 26. As will be understood, the feeder 78 has an inlet and an outlet. The feeder 78 is mounted adjacent the underside of preconditioner body 58 as shown, with the outlet thereof coupled to a depending tubular 82. The 82 is also provided with a bypass valve 84 operated through a position controller 86 (FIG. 10) so that improperly preconditioned material may be diverted from the extruder 26, typically during initial startup of the system 20.

The extruder 26 includes an elongated, tubular barrel 88 made up of end-to-end interconnected barrel heads 89 (see FIG. 5) and presenting an inlet 90 and an outlet end 92. An elongated, axially rotatable, helically flighted auger screw 93 made up of interconnected screw sections 93*a* is situated within the barrel 88 and is operable to move material received into inlet 90 along the length of the barrel 88 for ultimate extrusion through the die assembly 28. The internal screw is driven through a drive assembly 94, the latter being controlled through a conventional speed controller 96. The extruder barrel 88 also has steam and water injectors 98, 100 along the length thereof, with the latter being controlled by associated flow meter control valves 102, 104 (FIG. 10).

As those skilled in the art will readily understand, the barrel 88 and internal screw are configured to cooperatively generate appropriate levels of heat and shear to achieve the desired degree of extrusion processing. For example, the interconnected heads 89 may be configured to present internal ribs 89*a*, and steam locks 106 may be interposed between individual screw sections 93*a*. Such processing can also be aided and controlled by steam and/or water injection through the injectors 98, 100, and also by the use of externally jacketed barrel heads 89 permitting circulation of heating or cooling media therethrough for indirect temperature control. Although the depicted embodiment is a single screw extruder, twin screw units could also be employed.

The die assembly 28 is operatively connected to outlet end 92 of extruder barrel 88 and is in communication with the interior of the latter. The assembly 28 broadly includes a primary tubular head 108 presenting three spaced apart outlet openings 110, 112 and 114, a rotor 116 housed within the head 108, a drive assembly 118 operatively coupled with rotor 116 in order to selectively rotate the latter and a hinge mount assembly 120 permitting movement of the entire assembly 28 toward and away from barrel 88.

Figure 5:
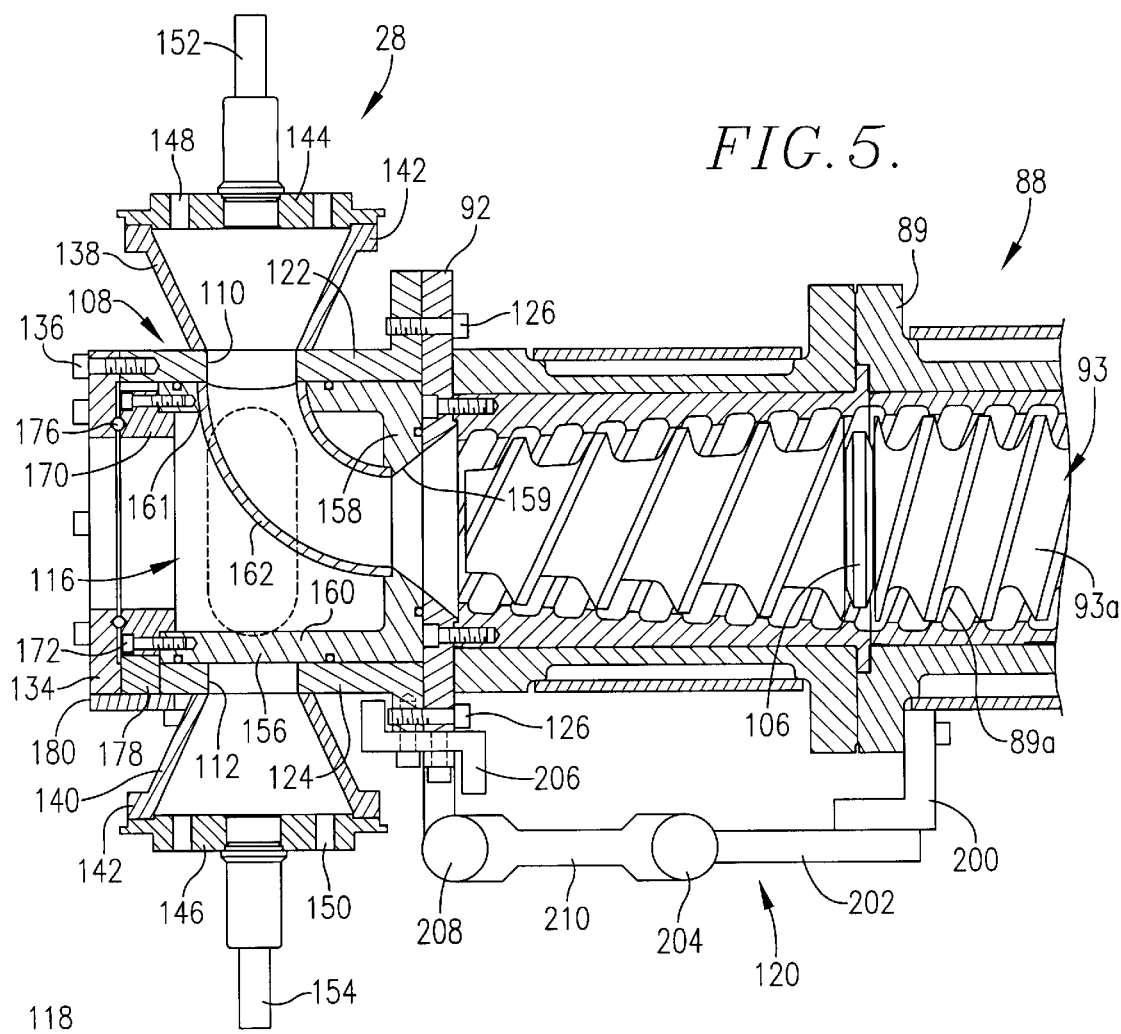
FIG. 5 is a sectional view taken along line 5—5 of FIG. 4 and illustrating further details of the extruder and multiple-position die assembly.
Figure 4:
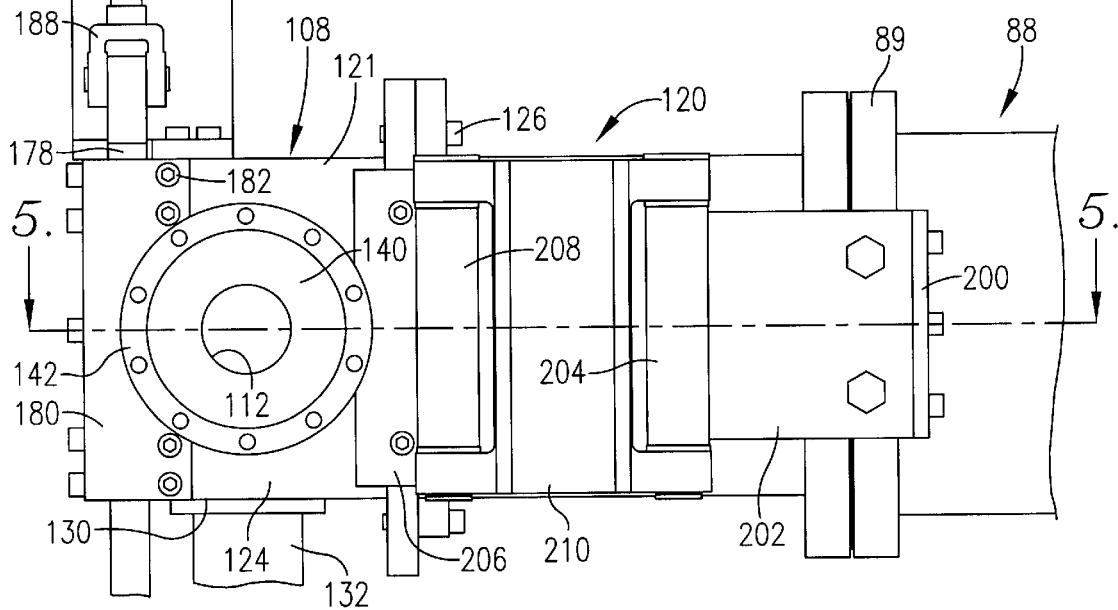
FIG. 4 is a fragmentary side view depicting the forward end of an extruder barrel and having the multiple-position die assembly of the invention mounted thereon.
Figure 6:
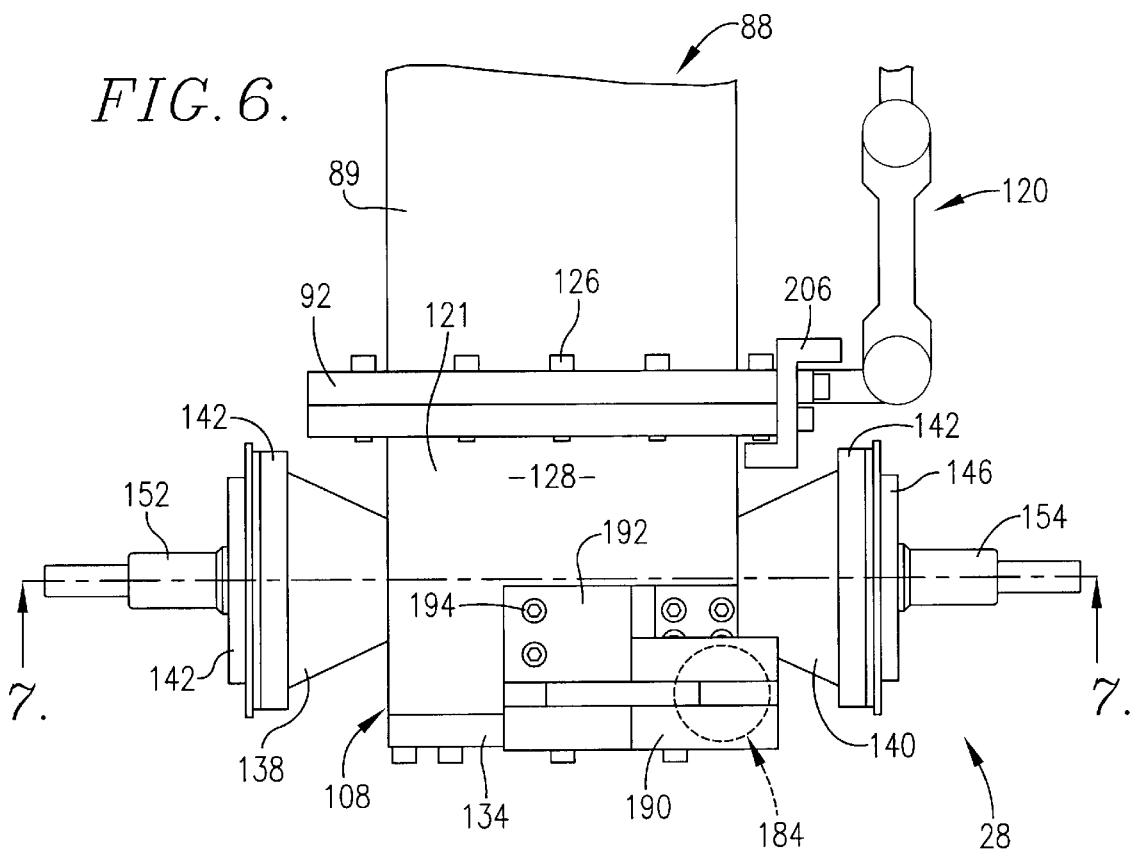
FIG. 6 is a fragmentary top view of the extruder barrel and multiple-position die assembly depicted in FIGS. 4–5.
Figure 7:
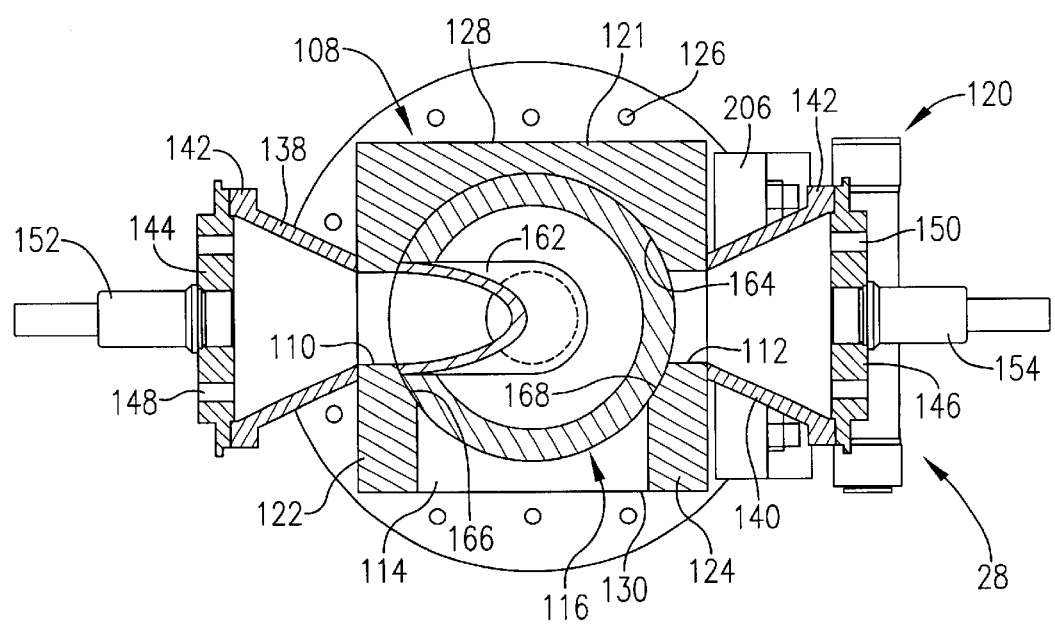
FIG. 7 is a sectional view taken along line 7—7 of FIG. 6 and illustrating the multiple-position rotor forming a part of the die assembly.

In detail, the head 108 includes a rearwardly flanged block 121 presenting a pair of spaced apart, apertured sidewalls 122, 124, and is normally secured to the endmost head 89 of barrel 88 by screws 126; as shown, the opening 110 is formed in sidewall 122, whereas the opposed opening 112 is formed in sidewall 124. The block 121 also presents a top wall 128 extending between the sidewalls 122, 124, as well as a bottom wall 130. As illustrated in FIGS. 5 and 7, an elongated discharge opening 114 is formed in bottom wall 130. A discharge chute 132 is secured to bottom wall 130 in registration with the opening 114. An end plate 134 extends between the sidewalls 122, 124 and is secured thereto by screws 136.

A pair of frustoconical die extension mounts 138, 140 are respectively mounted on a corresponding side plate 122, 124, in registry with the associated opening 110, 112. Each such mount 138, 140 has an outermost apertured mounting flange 142 configured to permit interconnection of a die plate 144, 146 thereon (plates 144, 146 are referred to as dies A and B in FIG. 10). Such die plates are themselves conventional, and include a plurality of extrusion openings 148 and 150 therethrough, and have a central, outwardly extending knife mount shaft 152 or 154.

The rotor 116 is located within head 108 and includes a substantially annular in cross-section body 156 having a rear wall 158 with a central product entrance opening 159 formed therein, and a forwardly extending annular wall 160 having an outlet opening 161 therein. An arcuate, elbow-shaped passageway 162 extends between and interconnects the rotor openings 159, 161. As best seen in FIG. 7, the rotor body 156 is supported for rotation on an upper arcuate surface 164 formed in the top of block 121, and on relatively small surfaces 166, 168 formed in the sidewalls 122, 124 immediately below the openings 110, 112. The effective surface areas presented by these lower supporting surfaces 166, 168 are each less than the effective width of the outlet opening defined by passageway 162. Thus, during rotation of the rotor 116 as will be described between its operative positions, the passageway 162 can never be completely blocked, thereby eliminating the possibility of potentially destructive pressure buildups within the die assembly 28.

The drive assembly 118 includes a pinion gear 170 secured to the outboard face of rotor body 156 by means of screws 172. The outer face of the gear 170 has a continuous bearing raceway 174, which cooperates with a similar raceway formed in end plate 134; bearings 176 are employed between the end plate 134 and gear 170 to guide the rotation of rotor body 156. As best seen in FIGS. 5 and 8, an elongated, upright rack 178 is in meshed, driving engagement with the gear 170. The rack 178 is mounted for up and down reciprocation by means of a rack guide plate 180 affixed to sidewall 124 via screws 182.

The overall drive assembly further includes a piston and cylinder unit 184 including a reciprocal piston rod 186 secured to the upper end of rack 178 by a clevis 188. The unit 184 is supported on block 121 by means of an upstanding mount 190. In particular, the mount 190 includes a base plate 192 which is affixed to the upper surface 128 of block 121 by mounting screws 194. The upper end of mount 190 affords a conventional pivotal connection for the cylinder of unit 184. While a rack and pinion drive as shown provides greater changeover speed, in some cases it is preferred to use a gear motor and pinion drive in lieu of the depicted rack and pinion.

The purpose of drive assembly 118 is to selectively rotate rotor 116 so that the outlet of passageway 162 will come into registry with either the die outlet openings 110 or 112, or discharge opening 114. In order to control such movement, the assembly 118 includes conventional position switches 196, 198 illustrated in FIG. 10.

The hinge mounting assembly 120 has a rearmost L-shaped mounting bracket 200 secured to barrel 88, with a forwardly extending plate 202 affixed thereto and supporting a rear hinge pin 204. The forward end of the assembly 120 has a dogleg connector plate 206 affixed to the adjacent flange of the forwardmost barrel head 89 and head 108. This connector supports a forward hinge pin 208. A spanning plate 210 extends between and is coupled to the hinge pins 204, 208 to complete the hinge construction.

Turning again to FIG. 2, it will be observed that a pair of motor driven rotary knife devices 212, 214 are respectively located adjacent a corresponding one of the die plates 144, 146. These knife devices are entirely conventional, and include rotary, power driven knife blades mounted on the die plate shafts 152, 154 described previously. In addition, these devices have associated speed controls 216 and 218 (FIG. 10).

Attention is next directed to FIG. 3, which depicts another extruder system 220 which is in most respects identical with system 20. Accordingly, like parts and components in FIGS. 1 and 3 are similarly numbered. However, in this case, the extruder assembly 221 has preconditioner 24 mounted in a vertical orientation, rather than the horizontal orientation of FIG. 1. Such mounting requires a slightly different preconditioner mounting frame 222 and different placement of load cells 224, all as shown in FIG. 3. Moreover, a slightly different transition 226 is provided to the inlet of screw feeder 78 as compared with the FIG. 1 embodiment.

FIG. 10 illustrates in schematic form the controller 30 associated with the extrusion system 20, as well as the interconnection of the various extruder control devices with the controller 30. The actual wiring and setup of the controller 30 is well within the skill of the art, in light of the foregoing disclosure and the ensuing operational description.

Operation of the Extruder Assembly

The general operation of the extruder assemblies 20 and 220 is known to those skilled in the art. That is, in a typical extrusion operation, dry materials are fed to surge bin 32 in a pre-mixed condition. This is done through conventional pneumatic handling equipment. The dry material then passes through slide gate 38 and enters live bottom bin 40 where it is continuously mixed by a rotating blending element.

The material is then fed through the variable speed feed screw 52 into preconditioner 24. In the preconditioner, the material is moisturized and partially cooked by addition of steam and/or water while mixing is carried out. Broadly speaking, conditions within the preconditioner include a maximum material temperature of from about 100–212° F., and a residence time of from about 30 seconds-5 minutes. The preferred preconditioner includes paddle components which retard the flow of material towards the preconditioner outlet in order to increase residence time. Where a horizontal preconditioner is used as in the embodiment of FIGS. 1–2, the majority of the paddle components along the length of the preconditioner are set for such material retardation, but the elements closely adjacent the outlet 62 are typically oriented for forward movement for material. In the case a vertically oriented preconditioner as depicted in FIG. 3, all of the paddle elements would be normally set for material flow retardation.

The provision of a preconditioner 24 with weighing devices 72, a variable speed, variable output feeder screw 52, and a variable speed, variable outlet discharge device 78, allows the user to vary the residence time of the material in the preconditioner during the course of an extrusion run. Heretofore, it has been impossible to vary the preconditioner residence time on-the-go, and efforts to alter the residence time have been limited to changing the type or position of the mixing elements within the preconditioner between runs. Simply changing the speed of the mixing elements is unworkable, because this significantly changes the characteristics of the output from the preconditioner.

For example, if the extrusion system of the invention is operating at a rate of 1 ton/hr. with a 2 minute preconditioner residence time, then the preconditioner 24 at any instant in time (after sustained operation is achieved) will contain about 67 lbs. of starting material. If the user decides to increase the preconditioner residence time to 4 minutes, it is only necessary to increase the speed of the inlet feeder screw 52 so that a greater mass flow rate into the preconditioner is established; however, during this period the discharge feeder 78 speed remains unaltered so that the 1 ton/hr. overall extrusion system speed is maintained. Additional material is then built up in the preconditioner 24 (as monitored by the preconditioner load cells 72) until the instantaneous weight of the starting material in the preconditioner doubles to about 134 lbs., thus also doubling the initial residence time to 4 minutes. At this point, the speed of inlet feeder screw 52 is reduced to its initial level, so that thereafter the residence time in the preconditioner is 4 minutes. Of course, if a reduction in preconditioner residence time is desired, the speed of inlet screw feeder 52 is decreased until a desired instantaneous weight and the corresponding residence time is achieved.

The preconditioned material is directed into and through the extruder 26, while the screw 93 is rotated. As in the case of the preconditioner, a variety of operating conditions can be established in the extruder 26, depending upon the desired end product. For example, the maximum material temperature achieved in the extruder may range from 80–400° F., with residence time of from 15 seconds–2 minutes. The pressure profile along the barrel length is extremely variable, but maximum barrel pressures commonly range from about 100–800 psi. Auger rotational speeds are also variable, and may range from 50–2000 rpm. In the case of pet food production, typical maximum temperatures would be from about 200–270° F. with a screw speed of from about 300–600 rpm.

The product is cooked and subjected to temperature and shear within the extruder, and is ultimately forced through a die plate for final cooking and forming. A large number of die plates can be employed, depending upon cooking conditions desired and product shape.

Turning now to the details of operation of the systems of the invention, it will first be appreciated that the presence of a variable output discharge device such as the screw feeder 78 is an important aspect. In order to produce acceptable product from a high percentage of the original starting materials, it is important that the screw feeder 78 be maintained in a choked condition for as long as possible, i.e., the feeder inlet must remain choke full. In this way, a constant and uniform flow of material is maintained to the extruder 26, in order to avoid, for as long as possible, a tailing off of product into and through the extruder which leads to varied and unpredictable cooking conditions and thus unacceptable end products.

Figure 11:
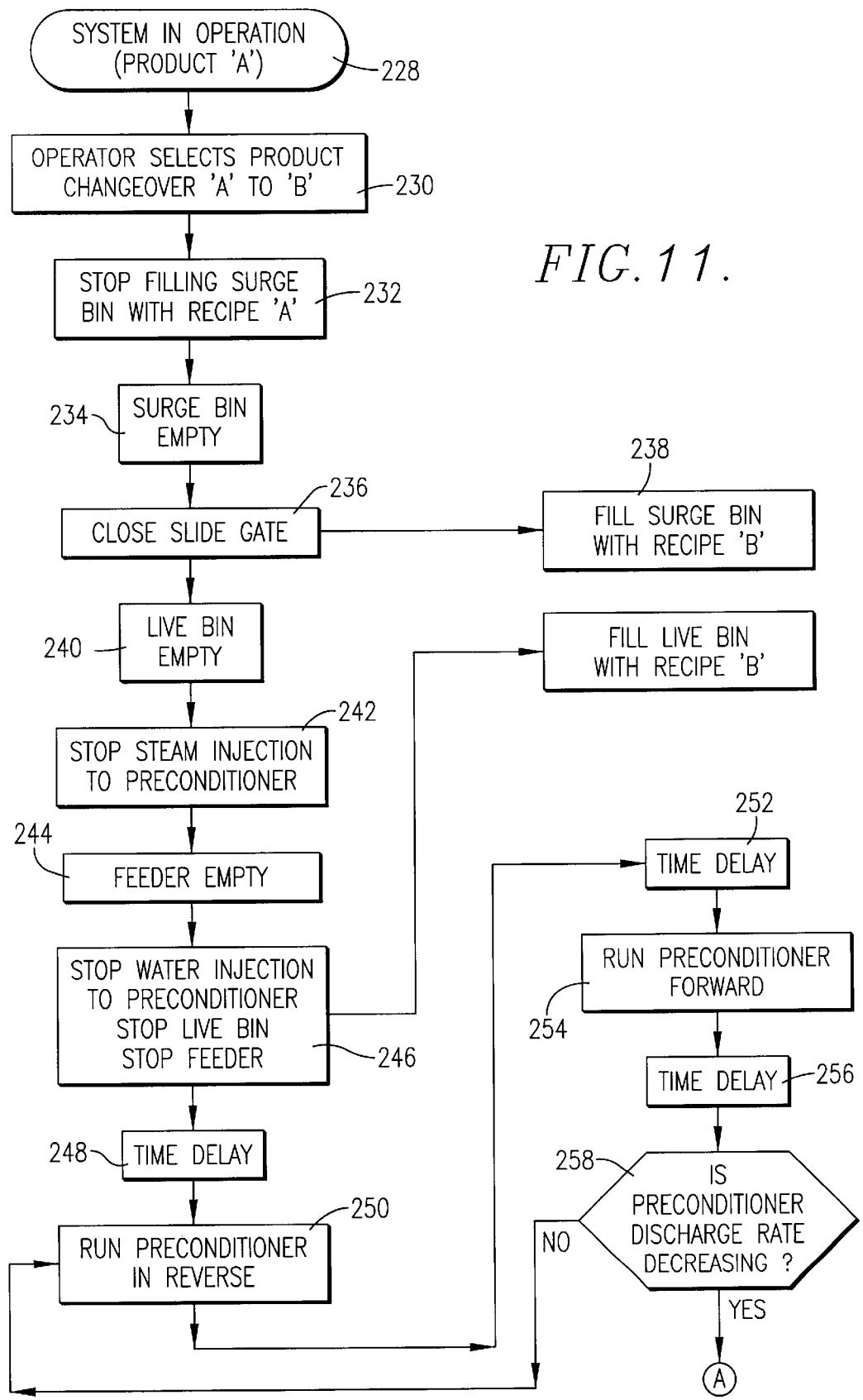
FIG. 11 is a flow diagram illustrating a portion of the preferred control software used in operating the extruder system of the invention.
Figure 12:
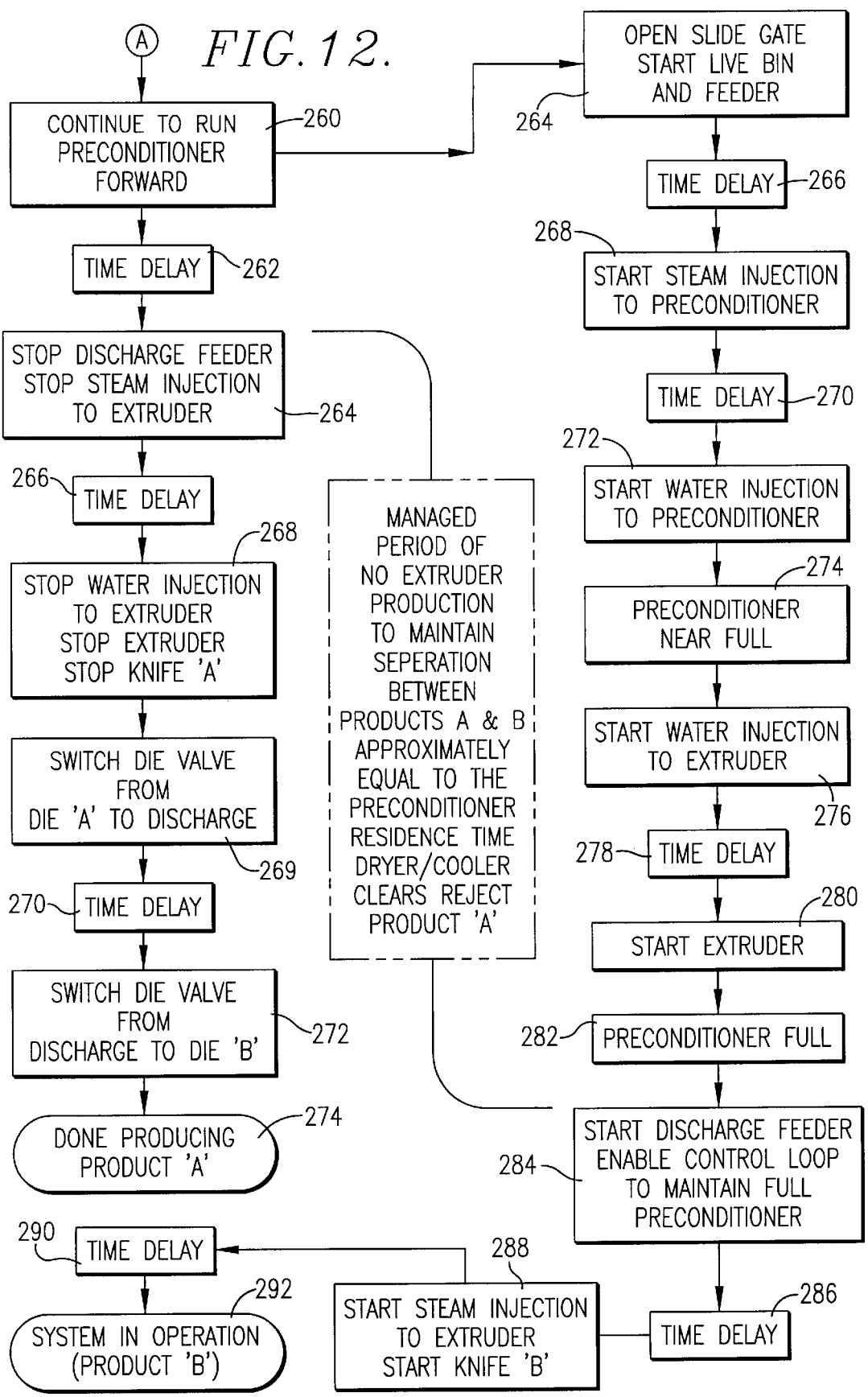
FIG. 12 is to be considered in conjunction with FIG. 11 and is another flow diagram illustrating the remaining portion of the preferred control software.

Attention is directed to FIGS. 11–12 which illustrate preferred control software which would be incorporated into the controller 30. In this discussion, it will be assumed that the user wishes to run two separate products A and B through the system 20 while avoiding significant waste of the starting materials and simultaneously minimizing the changeover time between the product runs.

Thus, as shown in FIG. 11 the system 20 is in operation producing product A (step 228). In this orientation, the system is set up for appropriate preconditioning and extruding of the product A materials (e.g., residence times, temperatures, pressures, and steam and water injection levels are established), and the die assembly 28 is set for die A operations. After an initial start-up using the ingredient formula for product A, the user would establish a substantially constant mass flow rate of preconditioned material from the preconditioner 24 through feeder 78 and outlet 82 into extruder barrel 88. This assures that during the majority of the product A run, uniform end product is produced.

At some point towards the end of the product run A, the operator in step 230 selects a changeover option whereby the system 20 will be changed over to begin producing product B. The changeover selection entails a step 232 where the flow of product A dry ingredients to the surge bin is terminated and the surge bin is allowed to empty (step 234). Next, in step 236 the slide gate mechanism 38 is actuated to close the gate, thereby preventing any further flow of material from the surge bin 32 to the live bottom bin 40. Thereupon, in step 238, the product B dry ingredients are feed into the surge bin 32.

The live bin is next emptied as indicated in step 240 until the last of the product A ingredients are fed to and processed within preconditioner 24. Such is known because of the load cells 46 which are coupled to controller 30. Also, steam injection into the preconditioner (step 242) is stopped, feeder 52 (step 244) is emptied, and water injection into the preconditioner is terminated while the operation of the live bin 40 is likewise terminated and the feeder 52 is shut down (step 246). Next, a time delay (step 248) is built into the software which permits preconditioning of the final charge of product A ingredients within the preconditioner. Towards the conclusion of the selected preconditioning time, the preconditioner 24 is run in reverse (step 250). This is done so as to push the preconditioned material forwardly toward the preconditioner outlet so that the full choke on the feeder 78 is maintained. In order to control this altered operation of the preconditioner, the controller allows the reverse operation to continue for a short period (step 252) whereupon the preconditioner is reversed for normal operation (step 254) for a time period (step 256). At this point the program determines whether the preconditioner discharge rate is decreasing (step 258). This is known owing to the fact that the surge bin 32 and the preconditioner 24 are supported on load cells 46 and 72, thereby permitting calculation of the mass flow rate through the preconditioner. If the discharge rate is not found to be decreasing, then the program causes the steps 250–256 to be repeated. This cycling continues until the discharge rate is shown to decrease. When this happens the preconditioner is run forwardly for a brief time (steps 260, 262).

As the preconditioner is essentially cleared of the product A materials through the completion of steps 260, 262, the slide gate mechanism 38 is actuated to open the gate between the bins 32, 40 and operation of the live bin feeder mechanism is initiated (step 264). From this point forward, two things occur simultaneously: first, the remaining fraction of the product A material is processed within extruder 26, and the product B materials are preconditioned. After the product A extrusion is complete, the preconditioned product B materials are then almost immediately fed to the extruder for processing. In this way only a minimum of changeover time is required between the product A and product B runs.

In detail, the final stages of the product A run involve stopping the discharge feeder 78 while steam injection to the extruder is also terminated (step 264). A time delay (step 266) then ensues, until water injection to the extruder is terminated, the rotation of screw 93 is stopped, and the operation of cutting knife A ends (step 268). Next the disk valve is switched to its discharge position (step 269). These steps of course occur toward the end of product flow through the extruder 26. After a suitable time delay (step 270), the valve mechanism 28 is switched from die A to die B (step 272). This of course finally concludes the product A run, as referred to in step 274.

The movement of the die assembly from its extruding, die A position first to its discharge position and then to its die B position is effected by actuation of the piston and cylinder unit 184 forming a part of the die assembly 28. Referring to FIGS. 7 and 8, when it is first desired to shift the passageway 162 from the die A position, the piston and cylinder assembly 84 is operated to retract rack 178 upwardly thereby rotating the rotor 116 through an arc of approximately 90° until the outlet end of passageway 162 comes into registry with lower opening 114. In this condition, the remaining product A (which would typically be unacceptable) is diverted through the opening 114 for disposal. After all of the product A material is thus passed, the unit 184 is again actuated to move the passageway 162 through another 90° arc until the passageway outlet comes into alignment with head opening 112. In this condition, the assembly 28 is of course ready for receiving and extruding the product B materials.

As indicated previously, during termination of the product A run through the extruder 26, the product B materials are being initially processed in the upstream components of the system 20. Referring again to FIG. 12, after the slide gate is opened in the live bin 40 and feeder 52 begin operation, a time delay (step 266) is permitted so as to appropriately fill the preconditioner with the product B ingredients. At this point, steam injection to the preconditioner is begun (step 268) for a time period (step 270), whereupon water injection is commenced (step 272). By the time that the preconditioner is essentially full (step 274), the extruder has essentially completed the extrusion of the product A materials and is ready to receive the product B ingredients. Just prior to delivery of the product B ingredients to the extruder, a water injection (step 276) for a time period (step 278) is carried out so as to flush remaining product A ingredients from the extruder; this of course occurs during the time that the die assembly 28 is in its discharge position.

Next, the extruder is started by rotation of the screw 93 (step 280) and the preconditioner 24 becomes full (step 282). the discharge feeder 78 is then started and essentially constant flow conditions through the preconditioner are established (step 284). After a short time delay (step 286) required to put the system 20 into its proper operational mode for the step B product, the steam injection into the extruder is started, along with the operation of knife B (step 288). A further time delay then ensues (step 290) whereupon the system 20 is in full and sustained product B operation (step 292).

As noted in FIG. 12, the controller 30 provides a managed period of no production between the product A and product B runs. This no-production period is typically about equal to the preconditioner residence time for product A.

The operation of extruder assembly 221 is very similar to that described above. However, owing to the use of a vertically oriented preconditioner, the described control loop of steps 250–258 is normally not needed. This is because the feeder 78 in this embodiment is inherently maintained choke full through gravitation of the product within the preconditioner.

The Dryer Assembly

The dryer assembly 29 (FIG. 13) forms apart of the overall extrusion system 20 and is designed to operate in conjunction with extruder assembly 21 or 221. The assembly 29 is preferably in the form of a multiple stage vertical cascade dryer 300. Cascade dryers are known, and those dryers commercialized by Wenger Manufacturing, Inc. of Sabetha, Kans. and especially preferred. Such dryers are illustrated in a 1999 Wenger brochure entitled "Wenger Cascade Dryer" incorporated by reference herein.

Generally speaking, the preferred dryer 300 is divided into plural vertically aligned stages (two of which (302, 304) are shown for illustrative purposes), each made up of a pair of interconnected decks 306, 308 and 310, 312. An initial fill deck 314 is located atop stage 302 as shown, while a final cooling deck 316 is disposed below stage 304. The discharge from cooling deck 316 is received by good/reject product conveyor 319.

Each of the decks 306–316 has a pivoting, multiple tray floor which is operated via a corresponding hydraulic cylinder gate drives 306a–316a so that the contents of each deck may be essentially instantly dumped and delivered to the deck next below at appropriate times during drying. The drying stages 302, 304 include steam or gas air heaters for heating input air thereto, with selectively controllable fan units and dampers to control airflow therethrough. The cooling deck 316 uses ambient derived air for cooling and for this purpose also has a fan unit. Airflow through the dryer 300 alternates up and down between decks, while the recirculated air is ultimately exhausted through the top of the dryer.

Each of the dryer decks has a number of sensors 318 (typically temperature, humidity, pressure and product level sensors) associated therewith. Also, conventional motor drives for the deck dampers and fans are provided.

The conveyor 319 is controlled via a direction controller 320 which allows the conveyor to be moved in opposite directions for separating good and reject product as will be explained.

Figure 13:
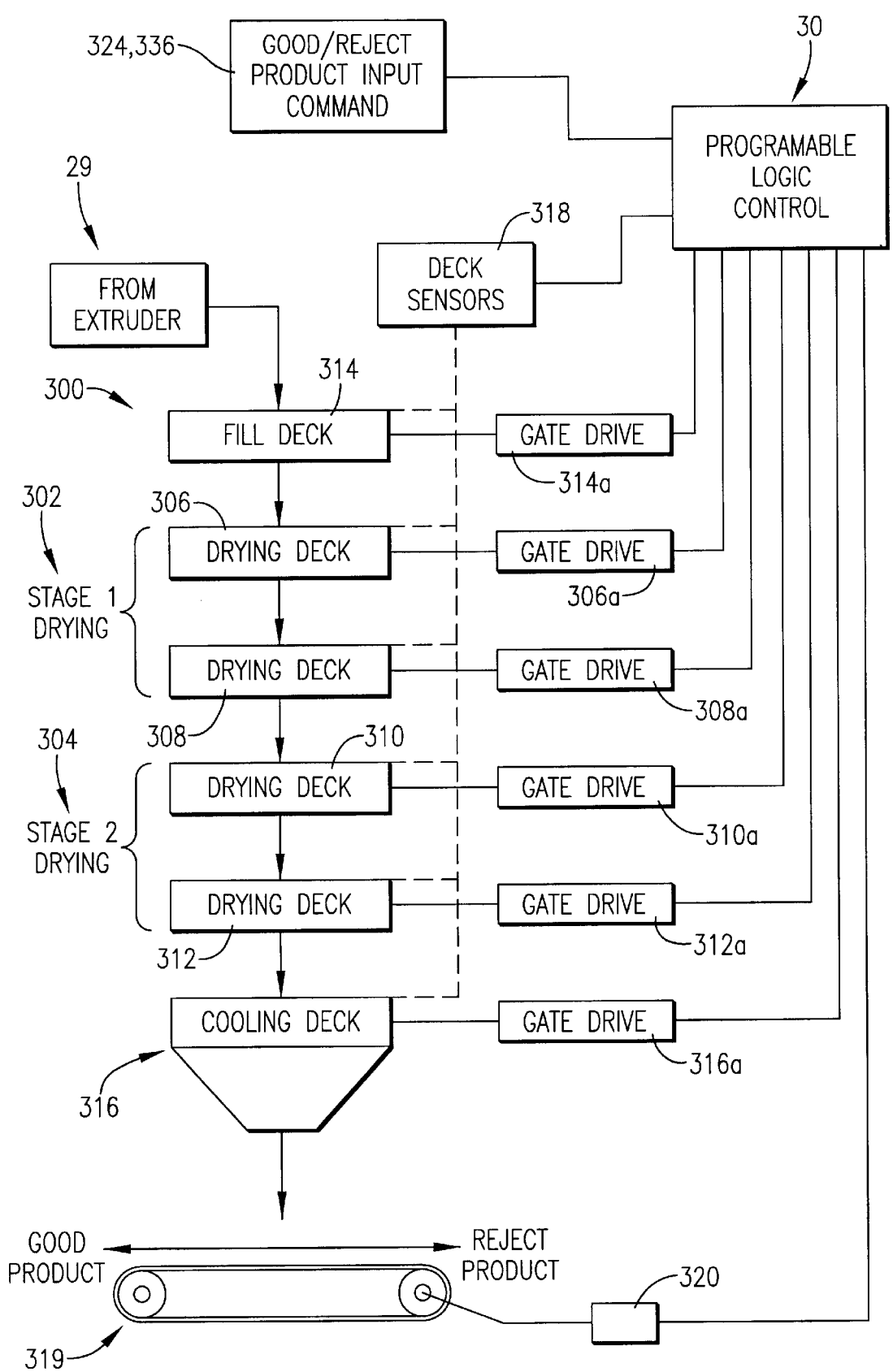
FIG. 13 is a schematic box diagram illustrating the control assembly for the dryer system of the invention.

Referring to FIG. 13, it will be seen that the gate drives 306a–316a, deck sensors 318 and direction controller 320 are all connected to PLC. It will also be appreciated that the aforementioned motor drives and other conventional sensing/control components may also be coupled to PLC. Again, the connection of these components to the PLC is conventional and will be fully understood in light of the following operational description.

Operation of the Drying Assembly

Figure 14:
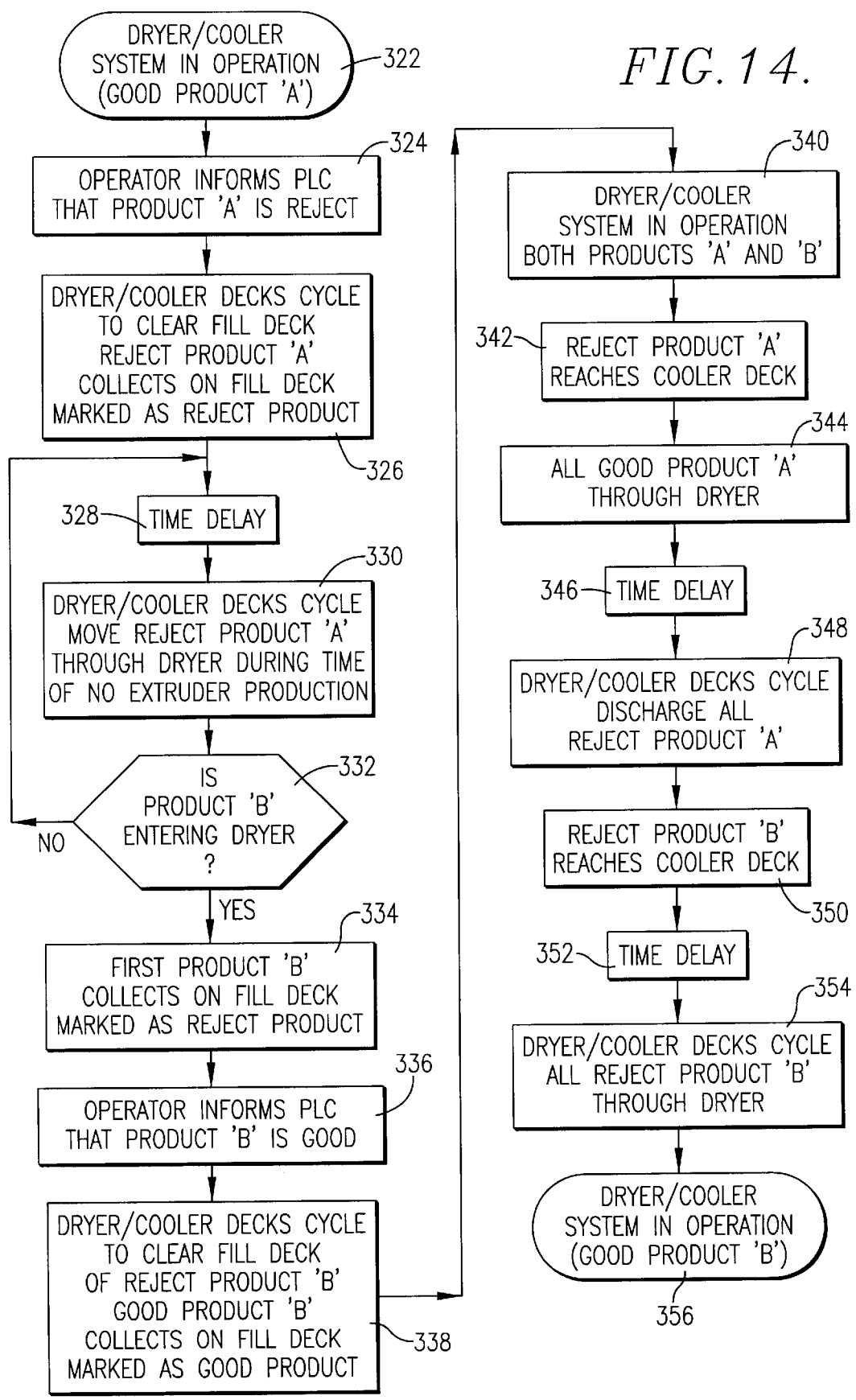
FIG. 14 is a flow diagram illustrating the preferred control software used in controlling the operation of the dryer system.

Referring now to FIG. 14, the control software used in conjunction with dryer 29 is illustrated. In this discussion, it is assumed that the two products A and B produced by the extruder as explained above in connection with FIGS. 11–12 are to be successively dried and maintained in a segregated condition.

Thus, at step 322, the dryer is in normal operation drying good product A. During this time, the appropriate air flows and air temperatures through the dryer are established and consistent for drying of product A, and the conveyer 319 is operated to collect the good product A. At some point however, the extruder is no longer producing acceptable product A, which would typically correlate with step 258 (FIG. 11) of the extruder operation. At this point the operator informs the PLC that the remaining product A is reject product (step 324, FIGS. 13 and 14). The dryer then continues to operate in the usual fashion, and clears the fill deck 314 of good product A to allow the deck to receive the reject product A (step 326). A time delay 328 then follows to permit the good product A to pass downwardly through the dryer for collection as good product. In step 330 the dryer is operating so that the decks thereof move the reject product A through the dryer during the period of no extruder production described with reference to FIG. 312. Of course, during this cycle, the conveyer 319 is operated to move the reject product A to a reject collection area.

At some point during the clearance of reject product A by the dryer, the extruder operation is commenced for product B (step 280, FIG. 12), and the initial product B is fed to the dryer. The PLC determines whether product B is entering the dyer, such being ascertained through the sensors 318 associated with fill deck 314 (step 332). If no product B is entering the dryer the program causes steps 328 and 330 to be repeated, until product B does enter the fill deck 314.

The initial product B is typically reject product and collects on the fill deck 314 (step 334). At some time in the product B extrusion, good product is generated. At this point the operator informs the PLC that the product B is good (step 336). The dryer decks then cycle to clear the fill deck 314 of reject product B, permitting good product B to collect on the fill deck (step 338). At the same time, the dryer cooler operates with both products A and B in separate ones of the decks 306–316 below the fill deck (step 340).

Next, the reject product A reaches the cooling deck 316 (step 342) and such reject product is then delivered to the conveyer 319 which still operates in a reject product mode. After all of the reject product A has been collected, the operation of conveyer 319 is changed to deliver subsequent product A to the good product collection point. Such good product A (step 344) moves in stages through the dryer 29 until all of the good product A passes through the dryer. A time delay 346 then ensues permitting the dryer decks to cycle and discharge all of the reject product A following as the tailings from the product A extrusion (step 348).

The next following product in the dryer is reject product B, derived from the initial startup of the extruder run B. When this reject product B reaches cooler deck 316 (step 350) a time delay 352 follows, allowing the reject product B to be cycled through the dryer (step 354) for collection as reject product. Having thus cleared all of the reject product B, the dryer 29 is then in regular operation for drying of the remainder of the good product B (step 356).

It will thus be seen that the present invention provides methods and apparatus for extrusion processing which meet two important and heretofore unattainable goals. First, product runs are made possible wherein substantially all of the starting material is processed as acceptable product, thereby eliminating the substantial waste common in prior systems. Second, it is now possible to run a series of relatively small runs in rapid succession, without undue down times between the runs.

We claim:

1. An extruder system, comprising:

an extruder having an elongated barrel with at least one axially rotatable, flighted auger therein, said barrel presenting a barrel inlet and a barrel outlet;

a die assembly mounted on said barrel outlet;

a preconditioner including shiftable mixing elements therein and having a preconditioner inlet for receiving material to be preconditioned, said preconditioner having a preconditioner outlet operatively coupled with said barrel inlet for feeding preconditioned material from the preconditioner into the barrel;

a bin assembly operatively coupled with said preconditioner inlet for feeding said material to be preconditioned to said preconditioner inlet; and apparatus permitting selective alteration of the residence time of said material within said preconditioner between a first residence time and a second, predetermined residence time different than said first residence time, said apparatus including a variable output feeder device operatively coupled with said preconditioner outlet, and a component for continuously weighing said preconditioner.

2. The system of claim 1, said component comprising a load cell operatively coupled with said preconditioner.

3. The system of claim 1, said apparatus operable to determine the mass flow rate of material passing through said preconditioner, the system including a controller operatively coupled with said apparatus and said extruder and said preconditioner for controlling the operation of the extruder system in response to said mass flow rate determination.

4. The system of claim 3, said controller including a programmable microprocessor.

5. The system of claim 1, said preconditioner comprising an elongated preconditioner body having said elements therein, the longitudinal axis of said preconditioner body being generally parallel with the longitudinal axis of said barrel.

6. The system of claim 1, said preconditioner comprising an elongated preconditioner body having said elements therein, the longitudinal axis of said preconditioner body being generally transverse relative to the longitudinal axis of said barrel.

7. The system of claim 6, said preconditioner being mounted in an upright, substantially vertical orientation above said barrel inlet.

8. The system of claim 1, said die assembly comprising a head having first and second spaced outlets, with first and second die members operatively coupled with the first and second die outlets respectively, there being a shiftable diverter for selectively and alternately diverting the flow of material from said extruder outlet into and through the first or second die outlets.

9. The system of claim 1, said bin assembly including a surge bin and a live bottom bin coupled in series, said first detector assembly including a first load cell being operatively coupled with said live bottom bin.

10. The system of claim 1, there being a variable speed, variable output discharge screw device between said preconditioner outlet and said barrel inlet.

11. An extruder system, comprising:
   an extruder having an elongated barrel with at least one axially rotatable, flighted auger therein, said barrel presenting a barrel inlet and a barrel outlet;
   a die assembly mounted on said barrel outlet;
   a preconditioner including shiftable mixing elements therein and having a preconditioner inlet for receiving material to be treated, said preconditioner having a preconditioner outlet operatively coupled with said barrel inlet for feeding preconditioned material from the preconditioner into the barrel; and
   apparatus permitting selective alteration of the residence time of said material within said preconditioner between a first residence time and a second, predetermined residence time different than said first residence time, said apparatus including a variable output feeder device operatively coupled with said preconditioner outlet, and a component for continuously weighing said preconditioner.

12. The system of claim 11, said component comprising a load cell operatively coupled with said preconditioner.

13. The system of claim 11, said device comprising a variable speed, variable output discharge screw device between said preconditioner outlet and said barrel inlet.

14. A method of operating an extrusion system to process a quantity of material, said extrusion system including an interconnected preconditioner and extruder, said extruder having an elongated extruder barrel having a barrel inlet and a barrel outlet and at least one elongated, axially rotatable lighted screw within the barrel, said preconditioner having a body with a preconditioner inlet, a preconditioner outlet, and shiftable mixing elements within the preconditioner body, said preconditioner outlet being operatively coupled with said barrel inlet for passage of preconditioned material from the preconditioner into the extruder barrel, said method comprising the steps of:
   initially processing said quantity of material by passing material from said quantity thereof into said preconditioner inlet and through said preconditioner while shifting said mixing elements, and causing the preconditioned material to pass from the preconditioner outlet and into and through said extruder, until a substantial fraction of said quantity of material is processed,
   during said initial processing step, establishing a substantially constant mass flow rate of preconditioned material from said preconditioner outlet and into said barrel inlet;
   after said substantial fraction of said quantity of material is processed in said initial processing step, continuing to pass additional material from said quantity thereof into said preconditioner until substantially the remainder of said quantity of material is within said preconditioner body; and
   while a portion of said substantial remainder of said quantity of material is within said preconditioner body, altering the operation of said preconditioner to substantially maintain said substantially constant mass flow rate of material passing through the preconditioner outlet and into said barrel inlet.

15. The method of claim 14, including the step of continuing to run said preconditioner until substantially all of said remainder of said quantity of material is passed into said barrel inlet.

16. The method of claim 14, including the step of determining said mass flow rate of material passing through the preconditioner outlet during said altered operation of said preconditioner.

17. The method of claim 14, including the step of determining said mass flow rate of material passing through the preconditioner outlet, during said initial processing step and said continued passage step.

18. The method of claim 16, including the step of weighing said preconditioner as at least a part of said mass flow rate determining step.

19. The method of claim 14, said mixing elements being mounted on an axially rotatable shaft, said operation-altering step comprising the step of reversing the direction of rotation of said shaft, as compared to the rotation thereof during said initial processing step.

20. A method of sequentially extrusion processing quantities of first and second different materials in an extrusion system, said extrusion system including an interconnected preconditioner and extruder, said extruder having an elongated extruder barrel having a barrel inlet and a barrel outlet and at least one elongated, axially rotatable flighted screw within the barrel, said preconditioner having a body with a preconditioner inlet, a preconditioner outlet, and shiftable mixing elements within the preconditioner body, said preconditioner outlet being operatively coupled with said barrel inlet for passage of preconditioned material from the preconditioner into the extruder barrel, said method comprising the steps of:
   initially processing said quantity of said first material by passing the first material from said quantity thereof into said preconditioner inlet and through said preconditioner while shifting said mixing elements, and causing the preconditioned first material to pass from the preconditioner outlet and into and through said extruder, until a substantial fraction of said quantity of first material is processed, during said initial processing step, establishing a substantially constant flow rate of preconditioned first material from said preconditioner outlet and into said barrel inlet;

after said substantial fraction of said quantity of first material is processed in said initial processing step, continuing to pass additional first material from said quantity thereof into said preconditioner until substantially the remainder of said quantity of material is within said preconditioner body;

while a portion of said substantial remainder of said quantity of first material is within said preconditioner body, altering the operation of said preconditioner to substantially maintain said substantially constant flow rate of first material passing through the preconditioner outlet and into said barrel inlet and passing said substantial remainder of said first material into said barrel inlet;

thereafter passing quantities of said second material into said preconditioner inlet and through said preconditioner body for preconditioning of said second material quantities; and passing said preconditioned second material quantities into said barrel inlet and through said extruder for processing of said second material.

21. The method of claim 20, including the step of determining the mass flow rate of said first material passing through the preconditioner outlet during said altered operation of said preconditioner.

22. The method of claim 21, including the step of continuously determining said mass flow rate of first material passing through the preconditioner outlet, during said initial processing step and said continued passage step.

23. The method of claim 21, including the step of weighing said preconditioner as at least a part of said mass flow rate determining step.

24. The method of claim 20, said mixing elements being mounted on an axially rotatable shaft, said operation-altering step comprising the step of reversing the direction of rotation of said shaft, as compared to the rotation thereof during said initial processing step.

25. An extruder system comprising:
   an extruder including an elongated barrel with an inlet, an outlet, at least one axially rotatable screw within the barrel, and a die adjacent said barrel outlet;
   a preconditioner including a mixing body with a series of shiftable mixing elements therein, said body presenting an inlet and an outlet, with said outlet operatively coupled with said barrel inlet; and
   apparatus permitting selective alteration of the residence time of said material within said preconditioner between a first residence time and a second, predetermined residence time different than said first residence time, said apparatus including a variable output feeder device operatively coupled with said preconditioner outlet, and a component for continuously weighing said preconditioner.

26. The system of claim 25, said component comprising a load cell.

27. A preconditioner assembly comprising:
   a hollow mixing body including a material inlet, a material outlet, and a series of shiftable mixing elements within the body, said body operable to receive material through said inlet, to precondition material and to deliver preconditioned material to said outlet; and
   apparatus permitting selective alteration of the residence time of said material within said preconditioner body between a first residence time and a second, predetermined residence time different than said first residence time, said apparatus including a variable output feeder device operatively coupled with said preconditioner outlet, and a component for continuously weighing said preconditioner.

28. The preconditioner of claim 27, said component comprising a load cell.

29. The preconditioner of claim 27, said apparatus including a controller, said discharge device and said component coupled with said controller.

30. In a method of operating an extrusion system having a preconditioner having an inlet and an outlet and an extruder coupled with said outlet to receive preconditioned material from the outlet, including the steps of continuously operating the preconditioner to deliver preconditioned material to the extruder at a substantially constant first rate and after a first residence time within the preconditioner, and continuously operating the extruder to process said preconditioned material, the improvement comprising the steps of varying the residence time of said material within the preconditioner to a second predetermined residence time different than said first residence time during said continuous operation of the preconditioner and extruder.

31. The method of claim 30, said residence time varying step comprising the steps of continuously weighing said preconditioner and varying the mass flow rate of material passing into said preconditioner inlet while maintaining the mass flow rate of material leaving the preconditioner outlet at a level to effect said change of the residence time.

32. The method of claim 31, including a variable output discharge device coupled with said outlet, said flow rate-varying step comprising the step of varying the output of the discharge device.

33. The method of claim 30, including a variable output feeding assembly coupled to said preconditioner inlet, said residence time varying step comprising the step of varying the feeder to vary the mass flow rate of material entering the preconditioner.

34. A bin and preconditioner assembly comprising:
   a bin assembly for holding material to be processed;
   a preconditioner including a hollow mixing body having an inlet and an outlet, said inlet operatively coupled with said bin assembly for continuous passage of said material from the bin assembly and into said preconditioner body; and
   apparatus permitting selective alteration of the residence time of said material within said preconditioner between a first residence time and a second, predetermined residence time different than said first residence time, said apparatus including a variable output feeder device operatively coupled with said preconditioner outlet, and a component for continuously weighing said preconditioner.

35. The assembly of claim 34, said component including a load cell operatively coupled with said preconditioner.

36. The method of claim 30, including the step of varying said residence time while maintaining the delivery of preconditioned material to the extruder at said substantially constant first rate.

37. In a method of operating an extrusion system having a preconditioner having an inlet and an outlet and an extruder coupled with said outlet to receive preconditioned material from the outlet, including the steps of continuously operating the preconditioner and extruder to process material passes serially through the preconditioner and extruder, the improvement comprising the steps of varying the residence time of said material within the preconditioner during said continuous operation of the preconditioner and extruder, said residence time varying step comprising the steps of continuously weighing said preconditioner and varying the mass flow rate of material passing into said preconditioner inlet while maintaining the mass flow rate of material leaving the preconditioner outlet at a level to effect said change of the residence time.

38. In a method of operating an extrusion system having a preconditioner having an inlet and an outlet and an extruder coupled with said outlet to receive preconditioned material from the outlet, including the steps of continuously operating the preconditioner to deliver preconditioned material to the extruder at a substantially constant first rate and after a first residence time within the preconditioner, and continuously operating the extruder to process said preconditioned material, the improvement comprising the steps of varying the residence time of said material within the preconditioner to a second predetermined residence time different than said first residence time during said continuous operation of the preconditioner and extruder, said residence time varying step comprising the steps of varying the flow rate of material passing into said preconditioner inlet while maintaining the flow rate of material leaving the preconditioner outlet at a level to effect said change of the residence time.

39. The method of claim 38, including the steps of varying the mass flow rate of material passing into said preconditioner while maintaining the mass flow rate of material leaving the preconditioner outlet at a level to effect said change of the residence time.

40. The assembly of claim 35, including first and second load cells operatively coupled with said bin assembly and preconditioner respectively.

41. The system of claim 2, including first and second load cells operatively coupled with said bin assembly and preconditioner respectively.

* * * * *